Nov. 15, 1966  L. W. WELLS  3,285,087
VARIABLE SPEED DRIVE SPROCKET
Filed July 24, 1963  3 Sheets-Sheet 1
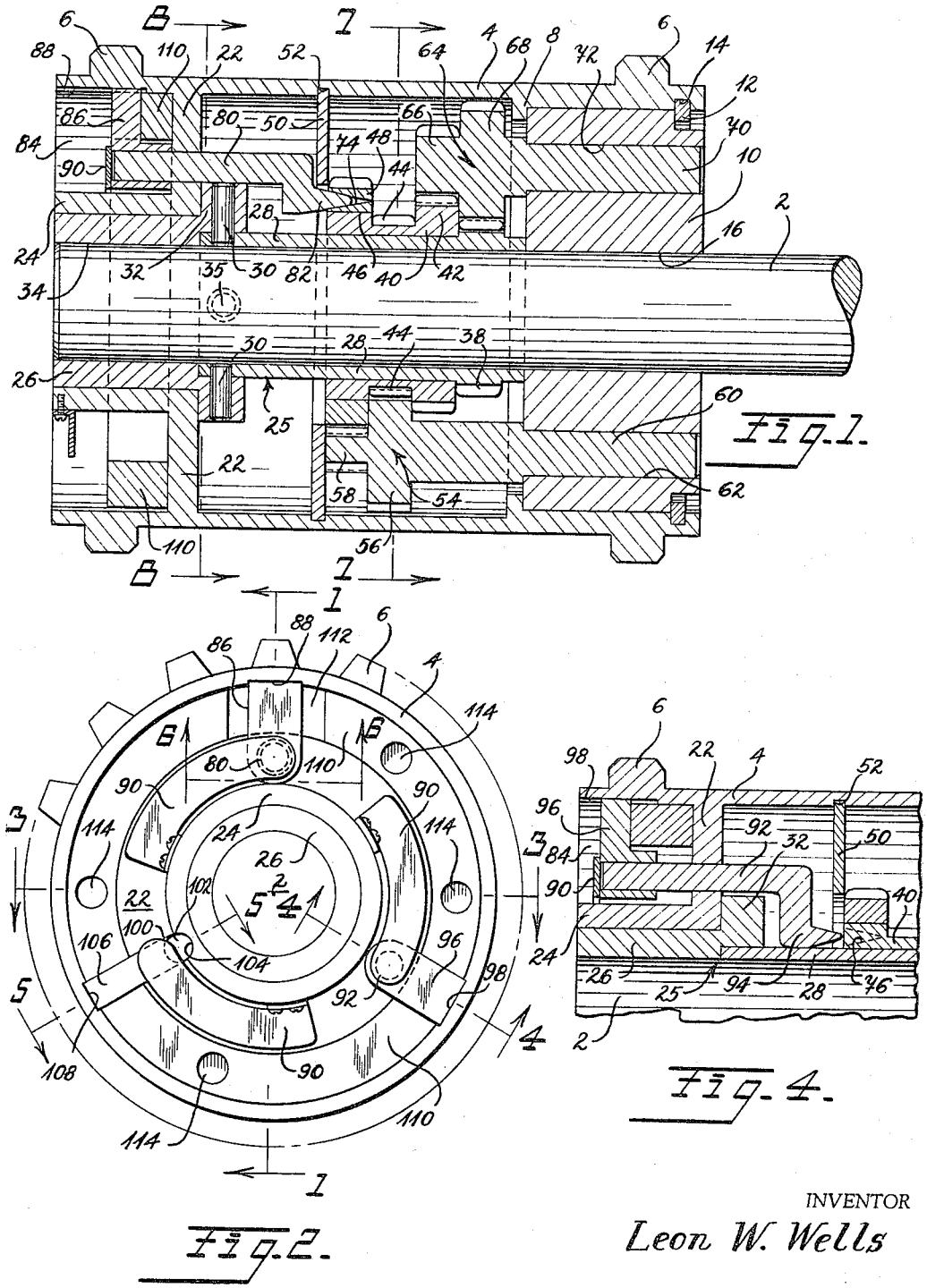
INVENTOR
Leon W. Wells
BY
Bacon & Thomas
ATTORNEYS Nov. 15, 1966   L. W. WELLS   3,285,087
VARIABLE SPEED DRIVE SPROCKET
Filed July 24, 1963   3 Sheets-Sheet 2

INVENTOR
Leon W. Wells

BY Bacon & Thomas
ATTORNEYS

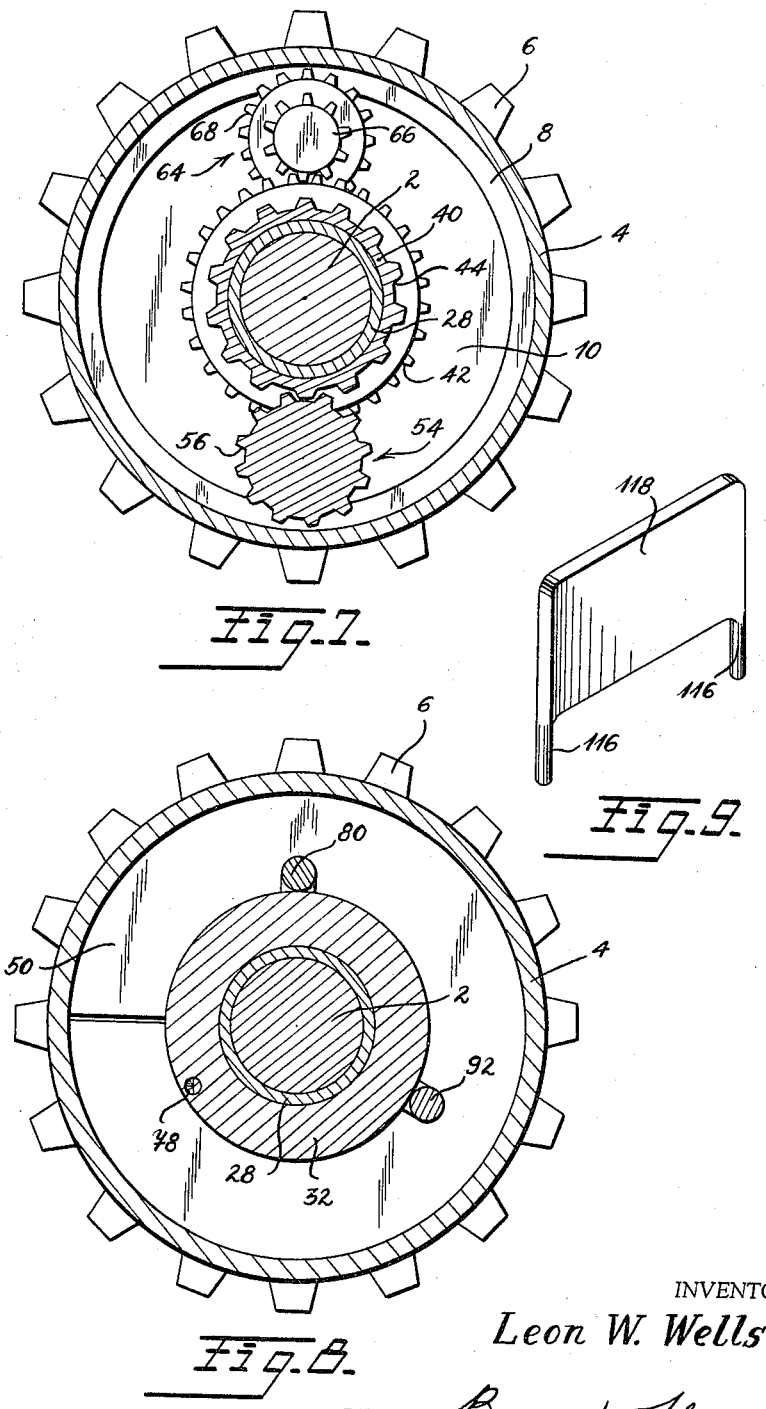

United States Patent Office 3,285,087
Patented Nov. 15, 1966

3,285,087
VARIABLE SPEED DRIVE SPROCKET
Leon W. Wells, Cloister, N.J., assignor to Panopix Research, Inc., New York, N.Y., a corporation of New York
Filed July 24, 1963, Ser. No. 297,457
11 Claims. (Cl. 74—330)

This invention relates to film driving sprockets for motion picture projectors and particularly to a novel sprocket adapted to replace sprockets on standard projection machines so that the machines may be readily adapted to project motion pictures from films in which the spacing between adjacent picture frames may be different for different films without changing the rate of pull down in the stop motion mechanism or any other operating characteristics of the projector.

Standard motion picture film, for example, 35 mm., is provided with a row of perforations along each edge for engagement by teeth on film driving sprocket drums. According to the American Standard Association (PH22. 1–1953), the spacing between perforations is such that four spaces total .750 inch. When a sound track appears on the film, it is placed adjacent one of the rows of perforations which leaves a usable width of film of .825 inch, which is the maximum available width for the picture frames.

Up to about 1950, all motion picture film was printed and projected with the width to height ratio of each frame being four to three. On the standard film described above, the width of each picture was .825 inch and its height was therefore .600 inch. This left a space of .150 inch between successive frames on the film. Obviously, the space between the frames was wasted but was not considered excessive. The projection machines in use at that time and at the present time all operate at the rate of 24 frames per second and the mechanism is arranged to pull down a length of film equal to four perforations, or .750 inch, for each frame.

At about 1950, the current "wide screen" pictures became popular and most theaters have now converted to such wide screens in which the width to height ratio of the picture is 1.85 to 1. The wide screen pictures are still printed on standard 35 mm. film on which each picture frame is .825 inch wide but only .445 inch high. By printing such pictures on film to be pulled down four perforations at a time, the spacing between successive picture frames on the film becomes .305 inch and this means that over 40% of the usable area of the film is wasted. Since the distribution of many films involves a printing of as much as five million feet of film for each release, it can be seen that the waste presently involved in the wide screen pictures is a very substantial amount.

Applicant proposes to eliminate much of this waste by printing the wide screen frames closer together lengthwise of the film and by pulling down the film, in the projectors, less than the standard four perforations. For example, by reducing the width of each picture frame to .666 inch but maintaining the same proportions, the height of the picture then becomes .360 inch. By allowing .015 inch between successive frames, two pictures can be imprinted on the film in the same space formerly occupied by one frame at the wide screen ratio. Thus, satisfactory projection would involve advancing the film only two perforations at each pull down instead of the previous four with substantially no loss of resolution and would result in a saving of 50% of the film formerly used. With this proposal only 23% of the film's usable area is wasted but at the same time there is a 50% gain in length of film used so that film cost, weight, shipping and handling costs and similar cost items are materially reduced and effect a very substantial saving. As an alternative proposal, the film could be pulled down three perforations at a time, permitting the pre-1950 width to height ratio or even ratios as high as 1½ to 1. Many theaters have not converted to wide screen but a saving in film could be effected for films intended for projection in even those theaters. By arranging for a pulldown of only three perforations, an immediate saving of 25% in film length is effected.

Applicant's proposals present no problems insofar as sound quality is concerned. The present speed of four perforations pulldown 24 times a second produces 90 ft./min. film advance. A three perforation pulldown at 24 frames/sec. gives a film speed of 67.5 feet/min., while a two perforation pulldown at the same rate moves the film at 45 ft./min. Good sound quality for theaters is possible at film speeds as low as 36 ft./min.

No problem would be involved in designing new projectors to handle film intended to be pulled down only two perforations at a time, or three or four perforations at a time, or even to be adjustable for all three rates. However, projection machines used professionally are rather expensive, precision devices and the expense of replacing each one would be prohibitive.

The present invention permits converting any standard projector to enable it to handle any of the above film proposals and to change from one to the other by means of a simple adjustment. Regardless of the longitudinal spacing between picture frames, they must be projected at the rate of 24 frames per second. All standard machines project at that rate and the pulldown mechanism and shutter speed are fixed at that frequency. Usually, three or four driven sprockets are used in each projector. At least two are used for drawing film from the supply reel and for forwarding it to the take-up reel, which sprockets are driven at a uniform rate equivalent to 24 frames per second. The pulldown sprocket, however, operates intermittently and is conventionally a drum having 16 sprocket teeth on its periphery and each advance involves rotation through 90°. The drive mechanism of the machine is usually fixed and of unvariable construction. In all such machines the sprockets are of standard diameter and operate in conjunction with pressure rollers and other film guiding means but in each case, the sprocket drums are secured to their supporting and driving shafts by set screws, pins or the like. The means of securing the sprockets on the shafts are readily accessible so that all driven sprockets can be easily and readily removed.

Applicant's invention involves a new sprocket adapted to replace those driven sprockets described above, which may be mounted on the same shafts, and which novel drive sprockets may be readily adjusted so that the drum portion itself rotates at the same speed or at a preselected fraction of the speed of the shaft upon which it is mounted. The invention involves the provision of novel gearing means connecting the shaft and sprocket drum and a speed selecting mechanism whereby the drum may be caused to rotate at the same speed as the shaft, at three-fourths the speed of the shaft or at one-half the speed of the shaft. Thus, the continuous feed sprockets and the intermittent sprockets of the present machines may be replaced and the proposed new films described above projected without further modification of the machines.

It is, therefore, an object of this invention to provide a replacement drive sprocket for motion picture projectors which is adjustable to advance the film at a plurality of different speeds, selectively, even though their driving shafts operate at a constant and fixed speed.

Another object of the invention is to provide a drive sprocket as set forth above which is of the same external dimensions as the drive sprocket being replaced.

Still another object is to provide a sprocket drive as set forth above and including a manually adjustable and readily accessible means for changing the speed of operation of the sprocket drum.

A further object is to provide a drive sprocket as set forth above which is simple and economical to make yet highly efficient and reliable in operation.

Further and additional objects and advantages will become apparent to those skilled in the art as the description proceeds with reference to the accompanying drawings wherein:

FIG. 1 is a longitudinal sectional view of a sprocket embodying the present invention mounted on a supporting shaft;

FIG. 2 is an end view of the structure of FIG. 1, as viewed from the left end thereof;

FIG. 4 is a fragmentary sectional view taken on the line 4—4 of FIG. 2;

Figure 3:
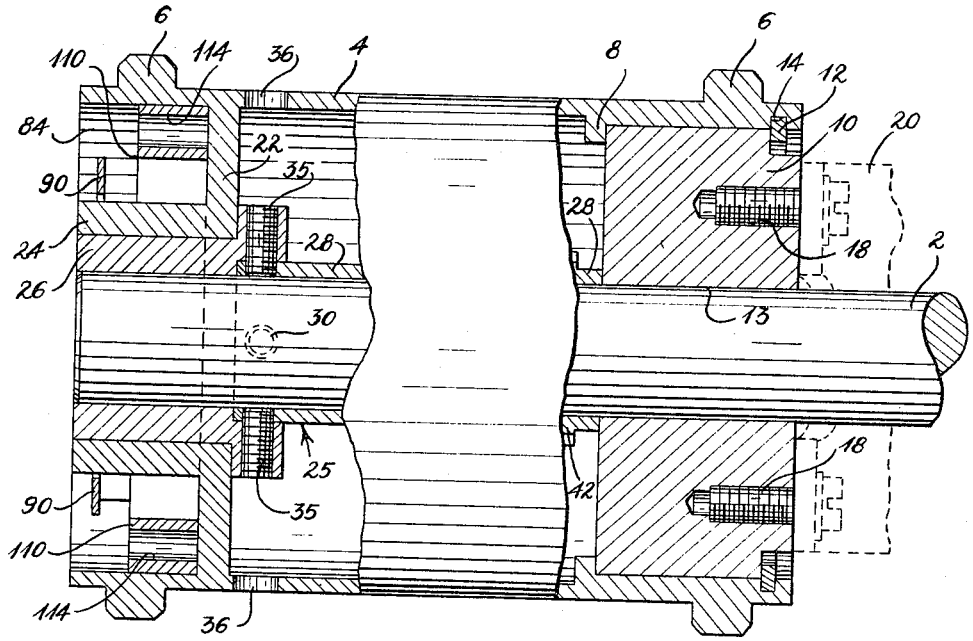
FIG. 3 is a longitudinal sectional view, similar to FIG. 1, but taken at right angles thereto, along the line 3—3 of FIG. 2.

FIGS. 7 and 8 are transverse sectional views taken on lines 7—7 and 8—8, respectively, of FIG. 1; and FIG. 9 is a perspective view of a spanner tool for use in making a speed selection.

In the drawings, numeral 2 indicates a driven shaft constituting a part of a motion picture projector and may be either a constantly rotating shaft or one that is caused to rotate intermittently, as is known in the art. Such shafts are presently provided with a unitary sprocket drum rigidly fixed thereto. According to the present invention, however, the cylindrical drum 4 is a hollow drum not directly secured to the shaft 2 but is of a diameter and length the same as that of the standard drum which it will replace. The hollow drum 4 is provided with sprocket teeth 6 adjacent each end, dimensioned and positioned to drivingly engage in the perforations of standard 35 mm. film. Of course, the device could be constructed to accommodate film of other dimensions.)

The drum 4 is provided with a small internal flange 8 inwardly from one end and against which a base member 10 bears. The base member 10 fits slidably within the open end of the cylinder 4 and its inward movement is limited by the flange 8 which functions as a thrust bearing. A split retainer ring 12 seated in a groove 14 in the drum retains the base member in the cylinder with its outer surface substantially flush with the end of the cylinder. The dimensions are such that the cylinder 4 is readily rotatable about the outer surface of the base member 10. The base member 10 is further provided with a central axial bore 16 of a size to rotatably receive the shaft 2. The base member 10 is also provided with a pair of threaded openings 18 (see FIG. 3) by means of which it may be fixedly secured to a stationary portion of the projector, as by being secured to a bracket 20, shown in dotted lines in FIG. 3. The bracket 20 may be an existing part of the projector or may be a bracket installed for the purpose of this invention. It will be seen, however, that the base member 10 is fixedly mounted in the projector whereas the hollow drum 4 is rotatable thereon. The left hand end of the drum 4, as seen in FIG. 1, is provided with an inwardly extending flange 22 spaced inwardly from the adjacent end and having an inner cylindrical wall portion 24 integral therewith and concentric to the outer periphery of the drum. The cylindrical portion 24 constitutes a journal for rotatably supporting one end of a sleeve assembly designated generally at 25. The sleeve assembly comprises one end portion 26 journalled in the cylindrical wall 24 and an inner portion 28 fixedly secured to the portion 26 by means of pins or the like 30. The portion 26 of the sleeve 25 is formed with an inner flange 32 bearing against the flange 22 of drum 4 and is thereby retained against outward movement. The inner portion 28 of the sleeve 25 extends axially through drum 4 into abutting engagement with the inner surface of base member 10. The sleeve member 25 is in the form of a hollow sleeve having an internal bore 34 of a size to snugly receive the shaft 2. The sleeve 25 is fixedly secured to the shaft 2 by set screws 35 (see FIG. 3) manipulatable through openings 36 in the drum 4. It will be apparent that the pins 30 and the set screws 34 lie in planes at right angles to each other.

The sleeve portion 28 is formed with an integral gear 38 on its outer periphery near the end thereof adjacent the base member 10. A member 40 is rotatably journalled on the outer surface of the sleeve portion 28 and is formed with a second gear 42 on its outer periphery adjacent the gear 38 on the sleeve and with a third gear 44 of different diameter than the gear 42. At its left end the member 40 is provided with a cylindrical surface 46 constituting a supporting and journalling surface for a fourth or ring gear 48 rotatably supported thereon. A split ring retainer 50 is seated in a groove 52 in a drum 4 and bears against the end of the teeth on ring gear 48 to retain the same against axial movement toward the left, as seen in FIG. 1. The retainer 50 also bears against the end of a cluster gear 54 having gear portions 56 and 58, respectively, meshing with gears 44 and 48. The cluster gear 54 is shown integral with a shank 60 journalled in a bore 62 in the base member 10. It is to be further noted that the large gear portion 56 retains the ring gear 48 against movement away from the retainer 50 and also engages a side of the gear 42 to retain the rotary member 40 against an end of gear 38.

A second cluster gear 64 is provided with a gear portion 66 meshing with gear 42 and a gear portion 68 meshing with gear 38. The cluster gear 64 is also shown as carried by an integral shank 70 journalled in a second bore 72 in the base member 10. The large gear portion 68 of cluster gear 64 is arranged with one face engaging an end of gear 42 whereby the cluster gear is retained in the illustrated position against axial movement toward the left.

The relative dimensions of the various gears shown and described are such that the rotary member 40 is caused to rotate in the same direction as shaft 2 but at only three-fourths of the speed thereof while ring gear 48 is caused to rotate in the same direction as the shaft 2 but at only one-half the speed thereof, when shaft 2 and sleeve 25 are rotated relative to base member 10. Further description of the relative diameter of the gears is not deemed necessary since it will be obvious to those skilled in the art how the gears may be formed and dimensioned to achieve the described relative speeds. It will thus be seen that, when the base member 10 is held stationary and the shaft 2 is rotated, the sleeve 25 turns at the same speed as the shaft, the rotary member 40 turns at three-fourths the speed of the shaft, and gear 42 turns at one-half the shaft speed. Means are provided for selectively clutching the drum 4 to the sleeve 25, to the member 40 or to the gear 48. In this connection, it is to be noted that the rotary member 40 and the gear 48 in fact constitute drive members for the drum 4, as does the sleeve 25.

Figure 5:
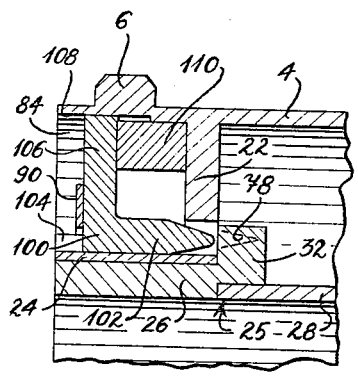
FIG. 5 is a fragmentary sectional view taken on the line 5—5 of FIG. 2.

A socket 74 is formed in the gear 48 and as shown extends through an axially facing surface of that gear and is open toward the left of FIG. 1. A similar socket 76 (FIG. 4) is formed in the left end face of drive member 40 and a socket 78 (FIG. 5) is formed in the left hand face of flange 32 of the sleeve portion 24. As seen in FIG. 1, a clutching member 80 extends axially and slidably through the flange 22 and is provided with an offset and pointed end portion 82 generally complementary in shape to the socket 74. The other end of the member 80 extends into an annular channel 84 defined by the end of drum 4, the inner cylindrical wall 24 and the flange 22. A guiding block 86 is fixed to the outer end of the member 80 and engages in a groove or key way 88 in the drum 4 whereby it may slide axially but cannot rotate about the axis of the slidable member 80. A leaf spring 90 secured to the inner cylindrical wall 24 (see also FIG. 2) bears against the outer end of the member 80 and/or block 86 and urges the member 80 to the axially inner position shown in FIG. 1 wherein the end portion 88 enters the socket 74 and is thus effective to clutch the drum 4 to the ring gear 48. With the drum clutched as shown in FIG. 1 to the gear 48, it will rotate at one-half the angular speed of the shaft 2, whether the shaft rotates continuously or intermittently.

Referring now to FIG. 4 there is shown therein a second clutching member 92 similar in construction and mounting to that already described but wherein the innermost end 94 is offset radially inwardly a greater distance than the end 82 of member 80. Thus, the tapered inner end 94 is at the same radial location as the socket 76 in the end of drive member 40. The member 92 likewise is provided with a block 96 slidably keyed to the drum 4 at 98 and urged inwardly by another spring 90 which may be identical to that previously described.

A third clutching member 100 (see FIG. 5) is provided but it is normally housed substantially completely in the annular chamber 84. An end portion 102 is slidably guided in a groove 104 in the outer surface of inner cylindrical wall 24 and the element is provided with an outwardly extending portion 106 slidably guided by a longitudinal groove 108 in the drum 4 and a third spring 90 urges the element 100 axially inwardly. The inner pointed end of the clutch element 100 is disposed at the same radius as the socket 78 in flange 32 so that it may be moved inwardly to engage that socket to effect clutching of the drum 4 to the sleeve 25.

Figure 6:
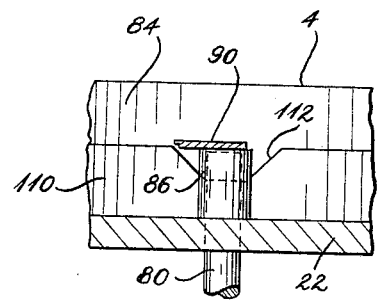
FIG. 6 is a fragmentary sectional view taken on the line 6—6 of FIG. 2.

FIG. 2 shows the relative angular positions of the three described clutching members 80, 92 and 100. It is obvious, however, that only one of the clutching members can be engaged with its corresponding driving member at any one time. To accomplish this result and to facilitate selection of the desired speed, a cam ring 110 is rotatably positioned in the annular channel 84 in a position to underlie the outwardly extending portions of blocks 86 and 96 and the outer extending portion 106 of clutch element 100. The three springs 90 thus urge those extensions into firm contact with the outer face of the ring 110 and at the same time retain the ring 110 in the channel 84. The outer face of ring 110 defines a planar annular surface except for a notched cam portion 112 (see FIG. 6). Obviously, the ring 110 may be rotated to position the cam notch 112 adjacent any selected one of the clutching members and thus permit associated spring 90 to move that clutching member axially inwardly into clutching engagement with its corresponding socket. In this manner the ring 110 serves as a manually operable element to effect selective clutching of the drum 4 to any selected one of its driving sockets. To facilitate rotation of the ring 110, its outer surface is provided with a series of diametrically opposed openings 114 engageable by the pin portions 116 (see FIG. 9) of a spanner or key 118. Irrespective of the position of the ring 110, a pair of the openings 114 is always exposed for engagement by the spanner 118. It is to be noted that the ring 110, springs 90 and all other elements located in the annular channel 84 are at all times housed and confined within the length of the hollow drum 4. Thus, the variable drive sprocket of the present invention may be substituted for a rigid sprocket in a standard projector and will occupy no more space than the rigid sprocket and at no time has any portion extending outwardly that could interfere with portions of the projection machine irrespective of how compact the original machine may be.

A single specific embodiment of the invention has been shown and described but it will be obvious to those skilled in the art that many modifications may be resorted to; for example, the spur gearing shown in the illustrative embodiment could in fact be any other kind of variable speed transmission mechanism. Furthermore, the base member 10 could be solid without a central bore 16 and the shaft 2 could extend into the drum from the opposite end and terminate short of the base member 10. Many other possible modifications will be apparent and all are intended to be included within the purview of applicant's invention insofar as they may fall within the scope of the appended claims.

I claim:

1. A film driving sprocket for a motion picture projector, comprising: a fixed base member having an outer cylindrical surface and a concentric bore; a hollow cylindrical drum journalled at one end on the outer cylindrical surface of said base member and having film driving sprocket teeth on its outer periphery; a driving shaft extending through the bore of said base member; at least one drive member disposed concentrically between said drum and said driving shaft and rotatable with respect to both said drum and said driving shaft; gearing in said drum interconnecting said base member, driving shaft and drive member whereby, when said driving shaft rotates relative to said base member, said drive member is rotated at a speed different from that of said driving shaft; and clutch means carried by said drum and accessible from the end of said drum opposite from said base member for selectively clutching said drum to said drive member or to said driving shaft.

2. A sprocket as defined in claim 1 wherein said gearing comprises a first diameter gear portion secured to said driving shaft; a second diameter gear portion formed on the outer surface of said drive member; and a cluster gear journalled on said base member and having portions meshing with said first and second diameter gear portions, respectively.

3. A sprocket as defined in claim 2 including a second drive member in said drum and rotatable about its axis; a driving connection between said one drive member and said second drive member whereby said second drive member rotates at a speed different from said one drive member; said clutch means including means for selectively clutching said drum to said second drive member.

4. A sprocket as defined in claim 1 wherein said driving shaft and said drive member are each provided with means forming an axially facing surface; an axially facing socket in each of said surfaces; said clutch means including axially slidable clutch members mounted in said drum; and manually operable means for selectively engaging one of said slidable clutch members in a corresponding one of said sockets.

5. A sprocket as defined in claim 1 wherein said drum is provided at one end with inner and outer concentric cylindrical walls defining an open annular channel therebetween; said outer wall comprising an end portion of said drum and said inner wall comprising a journal for an end of said drive shaft; said clutch means comprising: a plurality of angularly spaced movable clutch elements having portions extending into said annular channel; a manually rotatable ring in said channel and having a cam portion for selectively engaging and actuating said clutch elements, upon rotation of said ring.

6. A sprocket as defined in claim 5 wherein said clutch elements are axially movable in said drum and each is provided with a portion axially overlying the outer face of said ring; spring means urging said clutch elements axially inwardly of said drum and against said ring; said ring having an axially facing cam notch in its outer face and of a size to receive said overlying portions whereby said ring may be selectively positioned to permit inward clutching movement of only one of said clutch elements at a time.

7. A film driving sprocket for a motion picture projector, comprising; a hollow, cylindrical drum having film-driving sprocket teeth on its outer periphery; a base member mounted in one end of said drum; said drum being rotatable on said base member; means on said base for fixedly securing the same on a support; a sleeve rotatably mounted within said drum for rotation about the axis thereof and having an axial bore for receiving a driving shaft; means for securing said sleeve to said shaft for rotation therewith; a first gear on said sleeve; a first drive member journalled on the outer surface of said sleeve and having second and third different diameter gears thereon; a second drive member journalled on said first drive member and having a fourth gear thereon; a first cluster gear journalled on said base member and having portions meshing with said first and second gears; a second cluster gear journalled on said base member and having portions thereof meshing with said third and fourth gears; and clutch means in said drum for selectively clutching said drum to said sleeve, said first drive member or said second drive member.

8. A sprocket as defined in claim 7 wherein said gears are so proportioned that said first drive member is caused to rotate at three-fourths the speed of said sleeve and said second drive member at one-half the speed of said sleeve when said sleeve rotates relative to said base member.

9. A film-driving sprocket for a motion picture projector, comprising: a hollow cylindrical drum having film-driving sprocket teeth on its outer periphery; a base housed in one end of said drum; said drum being rotatable on said base member; means on said base for fixedly securing the same to an external support; a member rotatably mounted in said drum and having means for securing the same to a driving shaft to support said drum concentrically on said shaft for rotation thereon; variable speed transmission means interconnecting said member and said base; and selectively operable means for drivingly connecting said drum to said member or to said transmission means whereby to rotate said drum at different selected speeds when said member is rotated relative to said base at a predetermined speed.

10. A film driving sprocket as defined in claim 9 wherein said base, member, transmission and selectively operable means are housed completely within said drum; said selectively operable means including a manually movable element accessible at one end of said drum.

11. A film driving sprocket as defined in claim 9 wherein said transmission means is proportioned to rotate said drum, selectively, at one-half or three-fourths the speed of said member.

References Cited by the Examiner
UNITED STATES PATENTS

| | | | |
|---|---|---|---|
| 1,420,272 | 6/1922 | Matthews | 74—330 X |
| 1,577,004 | 3/1926 | Turney | 74—330 X |
| 2,399,451 | 4/1946 | Rothacker | 74—333 |
| 3,172,305 | 3/1965 | Schwerdhofer | 74—75 |

DAVID J. WILLIAMOWSKY, *Primary Examiner.*

J. R. BENEFIEL, *Assistant Examiner.*